Dec. 2, 1924.  1,517,569
J. O. MAUBORGNE ET AL
SYSTEM OF RADIO TRANSMISSION
Filed June 3, 1921   3 Sheets-Sheet 2

Inventor
Joseph O. Mauborgne
and Guy Hill

By Robert H. Young   Attorney

Dec. 2, 1924.　　　　　　　　　　　　　　　　　　　　1,517,569
J. O. MAUBORGNE ET AL
SYSTEM OF RADIO TRANSMISSION
Filed June 3, 1921　　　3 Sheets-Sheet 3

Inventor,
Joseph O. Mauborgne
and Guy Hill

By Robert H. Young
Attorney

Patented Dec. 2, 1924.

1,517,569

UNITED STATES PATENT OFFICE.

JOSEPH O. MAUBORGNE AND GUY HILL, OF WASHINGTON, DISTRICT OF COLUMBIA.

SYSTEM OF RADIOTRANSMISSION.

Application filed June 3, 1921. Serial No. 474,714.

*To all whom it may concern:*

Be it known that we, JOSEPH O. MAUBORGNE and GUY HILL, citizens of the United States, residing in Washington, District of Columbia, have invented new and useful Improvements in Systems of Radiotransmission, of which the following is a specification.

This invention relates to the art of radio signaling, and particularly transmitting radio signals, and a system for use in the practice of the same, having particular reference to our co-pending United States patent application bearing Serial Number 389,450 and constituting a continuation in part thereof together with improvements thereon.

The object of the present invention is an improvement in the method and apparatus for transmitting radio signals whereby a simplification in the antenna equipment required is effected; and, further, this system offers a simple method of obtaining transmission on commercial wave lengths on very small vehicles of land, air or marine type, whereon space available is too limited and confined for installation of heretofore prevalent types of antennas. It is likewise an object of this invention to provide an antenna capable of efficient radiation for permanent stations of any power occupying materially less space than that required by the heretofore known antenna systems.

Other objects will be in part obvious and in part pointed out hereinafter.

In order that the invention and its mode of application may be readily understood by persons skilled in the art, we have in the accompanying illustrative drawings and in the detailed following description based thereon, set out some of the embodiments of the same.

In our invention we made use of a wave coil antenna of distributed inductance and capacity on which a wave development is produced by the transmitting source, the wave length of the said wave development depending upon the electrical constants of the coil and the position of the potential application to said coil; the wave coil alone in some cases constituting the complete antenna system. In its simplest form the wave coil is made in the form of a long helix, uniformly wound with suitable insulated wire, or with bare wire on a suitable insulating support with its turns suitably spaced so that the inductance per unit length is relatively large. We get, therefore, in a comparatively short coil, the equivalent condition of a long line in the matter of wave development. The electro-magnetic waves of the outgoing signals are emitted from each element of the wave coil and we have here a condition where the electrical constants of the coil, the inductance, capacity, and resistance and E. M. F. set up therein by excitation from a suitable source of energy are all of a distributed character, and the energy is radiated from each element of the coil, making it accordingly an ideal radiating system.

The fundamental principle underlying the use of the wave coil as a transmitter is that there should be applied to some element of the coil, either a potential of a predetermined frequency and then the coil is to be adjusted to that particular frequency, or the coil itself may constitute the frequency-determining element of the system.

In our parent application referred to above the fact that our system is equally suitable for the transmission of damped and undamped waves is fully explained. In this application reference will only be made to the transmission of undamped wave signals either as interrupted or modulated continuous waves.

In our system herein described we impress a high frequency potential on the coil antenna and adjust the coil so that its natural wave length is the same as that of the source of high potential if the wave coil antenna system be ungrounded, or, if the wave coil antenna system be grounded, then the entire antenna system consisting of a wave coil, the lead to the set, the tuning elements in the transmitter proper and the ground connection are brought into tune with the wave length on which it is desired to transmit.

We have found that the following principles apply in the determination of the fundamental wave length of the coil antenna: First, the longest wave length is obtained when the point of application of the lead from the transmitter is the extreme end of the coil. If the lead is applied to the exact center of the coil, then each half radiates energy of the same wavelength but the wave radiated is shorter than in the preceding case. If the point of application of potential be at any point other than the end or center of the coil, it is possible to tune a transmitter to the longer or the shorter section of the coil. If the set is tuned to the longer section of the coil, no radiation will take place from the shorter end. If the shorter end is in tune, it is possible, under certain conditions, to obtain harmonic radiation, on the longer section of the coil.

As a source of energy we may employ any of the well known means of producing continuous waves such as high frequency alternators, arc, or vacuum tube transmitters.

The method of installing the wave coil whether it be in a horizontal or in a vertical position, or in any other position, and the height of the wave coil or wave coils above the transmitter will depend upon the conditions underlying the communication to be established.

The transmission efficiency of the coil antenna increases with its height above the transmitting set, or its earth connection.

While our invention as described in our parent application above referred to, consists primarily in the use of a wave coil and associated apparatus, without what is ordinarily known as antenna and ground connections, our invention also covers the use of such wave coils and associated apparatus, with either antenna or ground connections or both, provided the principle of setting up waves on the wave coil is used for the purpose of determining the frequency of the transmitted signals.

The principle of operation and the method of using our invention can be better understood by reference to the accompanying diagrammatic figures which show practical embodiments of the invention and form part of this specification.

In all of the figures herewith, the same symbols and nomenclature are used to designate the same apparatus, and therefore reference to the various common symbols will not be repeated, except in cases where it is necessary to make clear the difference between the various figures.

In the accompanying drawings, Figure 1 is a diagrammatic view of one form of the device used for the transmission of radio signals in which an undamped wave transmitting set, with modulating means, is used as a source of potential, said undamped wave transmitter having one terminal grounded and the other terminal connected to a wave coil.

Figure 1:
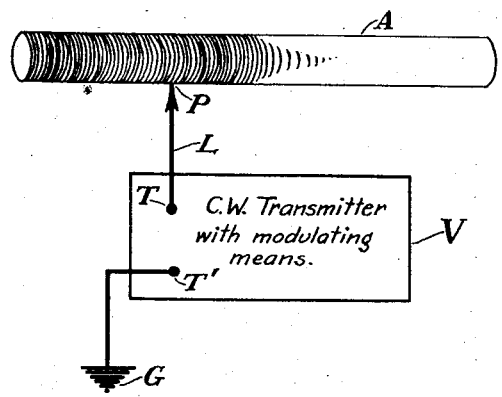

Having more particular reference to the drawings, and to Figure 1, A represents a wave coil, consisting of a helix of insulated wire, preferably copper, comparatively closely wound in a single layer on a suitable insulating tube. Bare wire with proper spacing may also be used wound on a proper insulating form. We prefer to make the length of the helix considerably greater than its diameter. P indicates one terminal of the lead L of suitable length, adapted to making direct contact with the wave coil at any desired point. L represents the lead of any desired length connecting the wave coil A with the transmitting set V, which in this case may be any form of transmitter which is capable of generating continuous waves and provided with suitable modulating means. T indicates the terminal of the transmitter which is connected to the lead L. T' represents the terminal of the transmitter which is connected to ground, G.

The principle of operation is as follows: The source of undamped waves is tuned to the same frequency as that determined by the antenna circuit consisting of that part of the wave coil antenna included between one end of the coil and connecting point P, the lead L, the necessary tuning arrangements within the set between the terminals T and T', and the lead to the earth connection shown at G on the diagram. In this case the potential applied to the wave coil sets up a wave on that part of the wave coil which is tuned to the transmitter and each element of that part of the wave coil radiates electro-magnetic energy of a definite period thereby forming an efficient radiating system.

In general, if the arrangement of the generator or generator circuits results in the production of oscillations of a definite frequency, the constants of wave coil A and the position of the connection point P should be so chosen as to result in bringing the wave coil into resonance with the oscillations of the transmitter.

Figure 2:
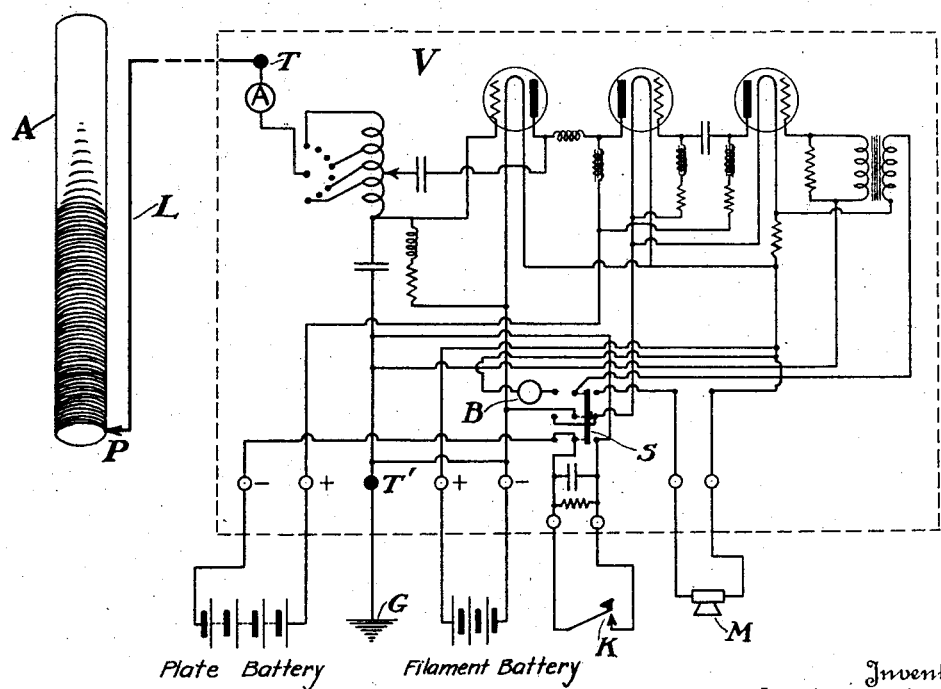
Figure 2 is similar to Figure 1 except that the details of one form of the transmitter for both telephone and telegraph purposes are shown.

In Figure 2 we have shown our invention as being actually reduced to practice. The wave coil A in this case is shown mounted vertically and connected to the continuous wave transmitter V through the medium of lead L which may be of any suitable length, which is connected to any point of wave coil A by means of connection point P, and to the antenna binding post T of transmitter V, the wave coil being mounted as far above the set as necessary for efficient communication. The transmitter V is of a type now prevalent in the art and for purposes of illustration may be said to be, briefly, a radio telephone transmitter and radio telegraph transmitter either of the continuous wave or buzzer modulated type. When the switch S of transmitter V is open, as shown in the drawing, the set is capable of transmitting continuous wave telegraph signals by means of key K. When the switch S is thrown to the right set V is capable of transmitting telephonic speech by means of microphone M. When switch S is thrown to the left hand side, the set is capable of telegraphing buzzer modulated signals by means of key K, the buzzer being indicated for convenience by B. The method of tuning with this arrangement is the same as that where the set is connected to an ordinary antenna, maximum radiation being indicated by the maximum current in the high frequency ammeter indicated in the figure by the usual convention. The functions of the various elements shown in the set are not described, as they form no part of our invention and will be readily understood by anyone skilled in the art. The circuit shown is merely a typical example of a form of vacuum tube continuous wave transmitter that may be employed.

Figure 3:
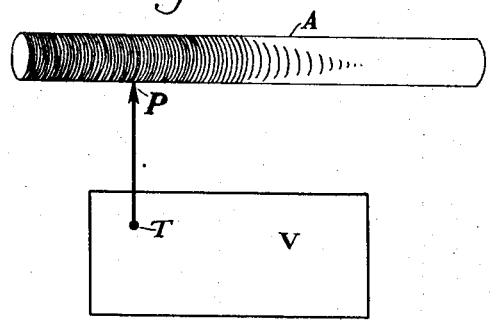
Figure 3 shows a diagrammatic view similar to Figure 1 except that ground connection is omitted.

The apparatus indicated by Figure 3 is similar to that indicated by Figure 1 except that the continuous wave transmitter is ungrounded. We have found that satisfactory radio telegraph and telephone signals can be transmitted without the employment of any ground connection. Resonance in this case, as in the apparatus described in Figure 1, is indicated by the maximum reading of the high frequency ammeter forming part of transmitter V.

Figure 4:
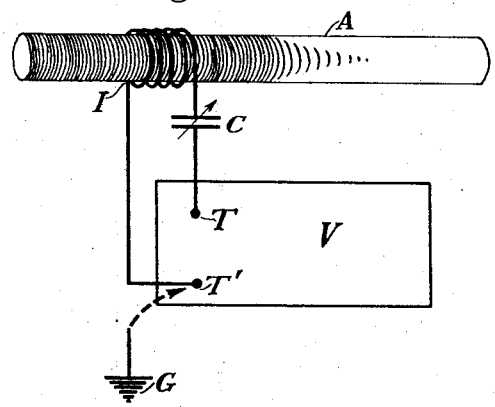
Figure 4 is a diagrammatic view showing a continuous wave transmitter with an external tuned circuit in inductive relation to the wave coil antenna and provided with or without ground connection as desired.

In Figure 4 the wave coil antenna indicated by A is coupled to the continuous wave transmitter V by means of an inductance I, the position of which can be varied longitudinally with respect to the wave coil A, whereby the period of the wave set up on wave coil A can be determined. The circuit external to the set V consisting of inductance I and condenser C is connected to the continuous wave transmitter V at its terminals T and T'. The tuning of the circuit I, C, and the variable elements within the set V, included between T and T' is so adjusted that this circuit has the same period as that determined by the position of inductance I on wave coil A and the constants of the wave coil antenna between the position of inductance I and one end of the wave coil A. This arrangement may be used as indicated with or without ground connection, G.

Figure 5:
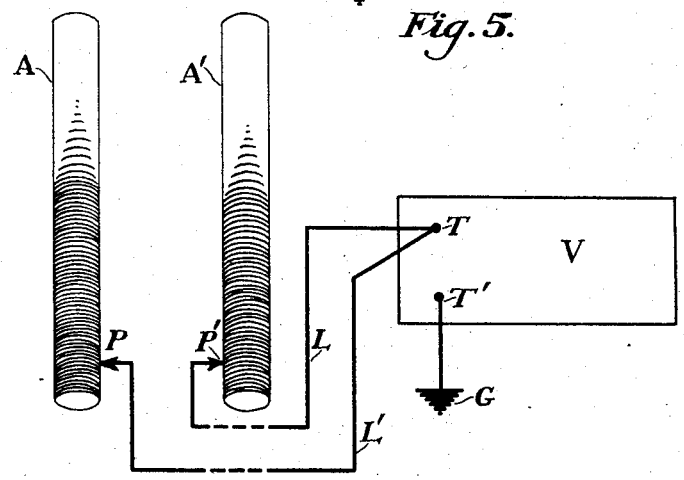
Figure 5 is a diagrammatic view showing an arrangement for exciting two or more wave coil antennas from the same source.

Figure 5 embodies a modification of our invention in which two wave coils A and A' respectively are simultaneously excited by the same continuous wave transmitting source V. The connections P and P' are adjusted on their respective wave coils so that both coils emit a wave of the same length, the advantages of this arrangement being that increase in the intensity of the transmitted signals is obtained and also a reduction of the voltages on the wave coils. Furthermore, heretofore, the main difficulty in transmitting on short wavelengths in the usual systems has been that in order to obtain radiation on an extremely short wavelength, the allowable amounts of inductance and capacity that can be used in tuning the circuits are so small that it is extremely difficult to get an appreciable amount of energy in the antenna or radiating system. This difficulty is obviated by our method as a large number of coils, each proportioned to give an extremely short wavelength can be operated in parallel and therefore an increased amount of energy can be obtained merely by connecting a sufficient number of suitably proportioned coils in parallel. While our figure indicates the use of only two wave coils in parallel, it is to be understood that any desired number of wave coils may be so employed as stated above. The length of leads L and L', the heights of the two or more wave coils above the transmitter V, and their distance apart, are to be arranged so as to secure the maximum transmission efficiency.

Figure 6:
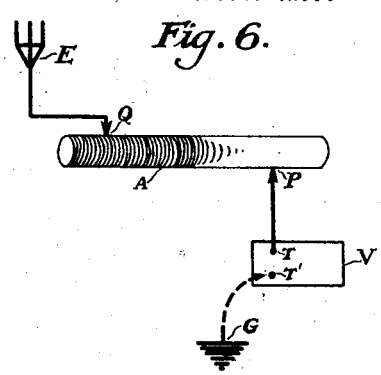
Figure 6 is an arrangement in which the wave coil is connected by a suitable lead and sliding contact to an antenna.

Figure 6 shows an arrangement in which the oscillations set up on the wave coil A by the transmitter V are transferred to an ordinary antenna E by means of a variable contact Q, directly connected thereto. The transmitting set V may or may not be grounded.

Figure 7:
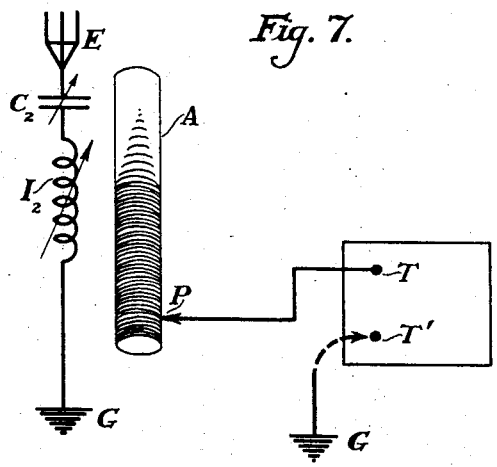
Figure 7 shows a diagrammatic view similar to Figure 1 except that the wave coil is inductively coupled with an ordinary antenna circuit, consisting of an antenna, variable inductance, capacity and earth connection.

Figure 7 is similar to Figure 6 except that in this case the wave coil A is coupled to the antenna system, consisting of antenna E, a condenser $C_2$, an inductance $I_2$ and ground G, instead of being directly connected to it.

Figure 8:
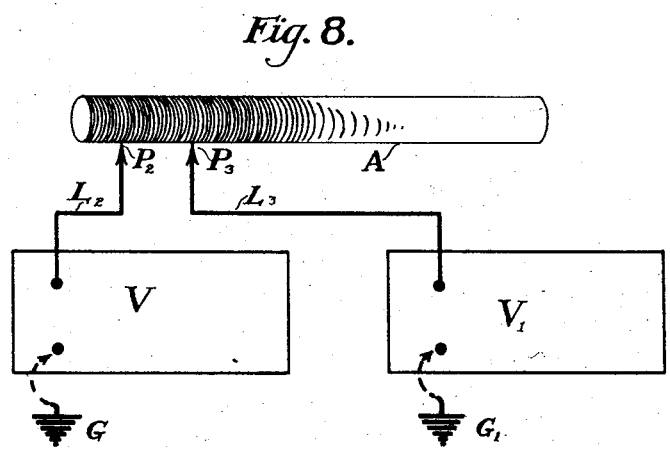
Figure 8 shows an arrangement for diplex transmission utilizing a single wave coil antenna with connections from two or more transmitting sets for radiation at different wavelengths.

Another modification of the invention is shown in Figure 8 in which two oscillation generators V and $V_1$ of continuous waves of different frequencies are connected by means of leads $L_2$ and $L_3$ to two points on wave coil A at $P_2$ and $P_3$, setting up thereon two waves of different lengths, thus effecting diplex signaling.

Figure 9:
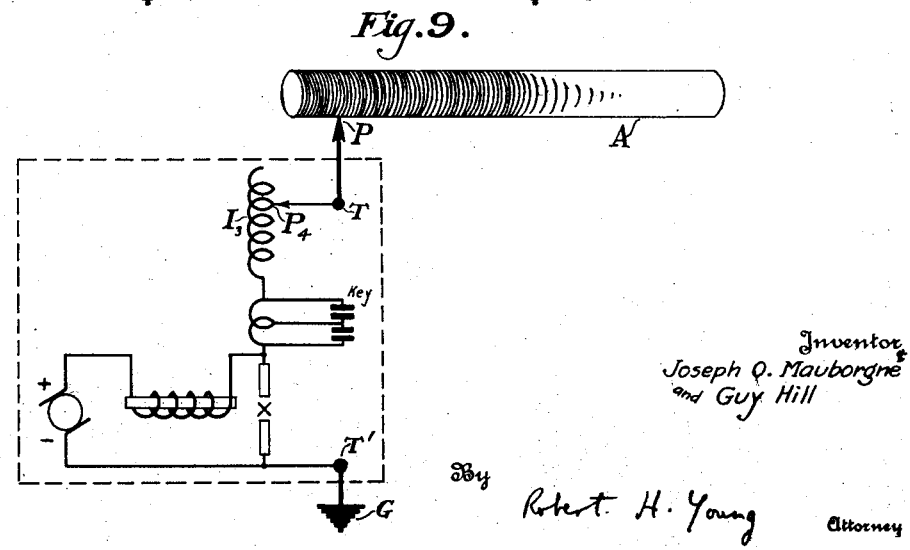
Figure 9 is an arrangement in which an arc generator is shown as the source of oscillations associated with a wave coil.

Figure 9 shows a diagrammatic arrangement wherein an arc equipment is used as an oscillator, the arc generator being connected to the wave coil. A represents the wave coil, P the variable contact connecting the wave coil A to generator V at terminal T, T being connected by a variable connection $P_4$ to the antenna loading inductance $I_3$ while the other elements of the arc transmitter are merely shown conventionally in the diagram for the purpose of illustration. The arc set is shown grounded at the terminal T', in the usual manner. If, in using the wave coil antenna with an arc generator, inductance $I_3$ is either eliminated or made very small, the wavelength transmitted will depend entirely upon the characteristics of the wave coil antenna A and the point of application P.

The above specifications and figures are considered to illustrate only some of the elementary forms of this invention and its use. All the various forms of connecting it in circuit are not specified herein, as they will, in general, be evident as obvious modifications to anyone skilled in the art.

Claims:

1. In a system for transmitting radio signals including a resonance wave coil, means for applying an undamped high frequency high potential source to an element of a wave coil, means for effecting a wave development on the coil, and means for modulating the source of undamped oscillations.

2. A system for transmitting radio signals employing a wave coil of distributed inductance and capacity, an energy source of undamped oscillations connected to only one element of said wave coil, means for selecting the element of said wave coil so that the wave coil will be in resonance with the frequency of the energy source, and means for modulating undamped oscillations for the purpose of signalling.

3. A system for transmitting radio signals comprising a wave coil antenna system including a wave coil, grounded tuning elements, and a lead connecting said resonance wave coil to the grounded tuning elements, an energy source of undamped oscillations coupled to said tuning elements, means for selecting the element of the wave coil to which the lead from the source of undamped oscillations is attached so that the wave coil is in resonance with the frequency of the energy source, and means for modulating the undamped oscillations for the purpose of signalling.

4. In a system of transmitting radio signals, including a resonance wave coil, means for applying a high frequency potential, from a single source, on two or more wave coils, means for effecting a wave development thereon, and means for modulating the source of high potential.

5. A system for transmitting radio signals, comprising an antenna system including an antenna, a wave coil, tuning elements, and ground connections all in series, said tuning elements being operatively associated with an energy source of undamped oscillations, means for selecting the elements of the wave coil to which said antenna and grounded tuning elements are connected so that the wave coil associated with antenna will be in resonance with the frequency of the energy source, and means for modulating the undamped oscillations for the purpose of signalling.

6. A system for transmitting radio signals, comprising a wave coil, two or more energy sources of undamped oscillations, each of said energy sources being connected to a different element of said wave coil, each of said oscillation sources having associated therewith independent tuning elements, means for selecting the different elements of the wave coil to which said energy sources are respectively connected, so that the wave coil is simultaneously in resonance with the different frequencies of the respective sources of oscillations.

7. A system for transmitting radio signals comprising a wave coil, two or more energy sources of undamped oscillations, each of said energy sources being connected to a different element of said coil, each of said oscillation sources having associated therewith independent tuning elements and ground connections, means for selecting the different elements of the wave coil to which said sources are respectively connected, so that the wave coil is simultaneously in resonance with the different frequencies of the respective undamped sources of oscillations, and means for independently modulating each of said sources of undamped oscillations for the purpose of signalling.

8. A system for transmitting radio signals comprising two or more wave coils, each having distributed inductance and capacity in the form of an open circuit having grounded tuning elements, an energy source of undamped oscillations, said energy source being connected to corresponding elements of said wave coils, means for selecting the corresponding elements of the respective wave coils to which the leads from the source of undamped oscillations are attached so that the wave coils are each in resonance with the frequency of the energy source, and means for modulating the undamped oscillations for the purpose of signalling.

JOSEPH O. MAUBORGNE.
GUY HILL.